United States Patent
Patel et al.

(10) Patent No.: US 8,269,445 B2
(45) Date of Patent: Sep. 18, 2012

(54) LIMP HOME OPERATIONAL MODE FOR AN ELECTRIC VEHICLE

(75) Inventors: Nitinkumar R. Patel, Cypress, CA (US); Peter J. Savagian, Bloomfield Hills, MI (US); Yo Chan Son, Torrance, CA (US); Rostam Dehmoobed Nasrabadi, Proter Ranch, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/582,534

(22) Filed: Oct. 20, 2009

(65) Prior Publication Data

US 2011/0089875 A1   Apr. 21, 2011

(51) Int. Cl.
*H02K 29/12*   (2006.01)

(52) U.S. Cl. .............. 318/400.37; 318/661; 318/701; 324/207.25

(58) Field of Classification Search .......... 318/400.37, 318/661, 701, 782; 324/207.25; 341/9, 111, 341/155
See application file for complete search history.

(56) References Cited

U.S. PATENT DOCUMENTS

| | | | | |
|---|---|---|---|---|
| 5,650,779 A | * | 7/1997 | Sugden | 341/9 |
| 5,652,494 A | * | 7/1997 | Sugden | 318/701 |
| 5,723,858 A | * | 3/1998 | Sugden | 250/231.13 |
| 6,972,700 B2 | * | 12/2005 | Kanekawa et al. | 341/116 |
| 7,002,318 B1 | * | 2/2006 | Schulz et al. | 318/782 |
| 7,343,254 B2 | * | 3/2008 | Otsuka et al. | 702/58 |
| 2004/0124806 A1 | * | 7/2004 | Ehsani et al. | 318/701 |
| 2005/0162292 A1 | * | 7/2005 | Kanekawa et al. | 341/111 |
| 2005/0252272 A1 | * | 11/2005 | Otsuka et al. | 73/1.01 |
| 2005/0280570 A1 | * | 12/2005 | Kanekawa et al. | 341/155 |
| 2008/0284366 A1 | * | 11/2008 | Fu et al. | 318/661 |
| 2009/0206828 A1 | * | 8/2009 | Yamaura et al. | 324/207.25 |

* cited by examiner

*Primary Examiner* — Paul Ip
(74) *Attorney, Agent, or Firm* — Ingrassia Fisher & Lorenz, P.C.

(57) ABSTRACT

Methods and apparatus are provided for a limp home operational mode for an electric motor system. The method includes determining whether a resolver has failed. When the resolver has not failed, operation of the electric motor system uses resolver signals. When the resolver fails, operation of the electric motor system uses sensorless rotor position and rotor speed signals.

20 Claims, 5 Drawing Sheets

600

LIMP HOME OPERATIONAL MODE FOR AN ELECTRIC VEHICLE

TECHNICAL FIELD

The present invention generally relates to electric motor systems for electric and hybrid vehicles, and more particularly relates to a method and apparatus for enabling a limp home operational mode in an electric motor system for an electric or hybrid vehicle.

BACKGROUND OF THE INVENTION

Electric motor systems in electric or hybrid vehicles utilize a resolver coupled to an electric motor system thereof to generate signals corresponding to a position and a speed of a rotor of the electric motor. When the resolver fails, however, the electric motor system cannot provide position and speed signals necessary for control of the electric motor system.

Accordingly, it is desirable to provide a method and apparatus for limp home operation that is operable when the resolver fails. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A limp home controller is provided for controlling operation of an internal permanent magnet motor, the controller including a sensorless speed and position estimator and a signal selector. The sensorless speed and position estimator generates sensorless rotor position and rotor speed signals. The signal selector is coupled to a resolver for receiving sensed rotor position and rotor speed signals from the resolver and is coupled to the sensorless speed and position estimator for receiving the sensorless rotor position and rotor speed signals therefrom. The signal selector determines whether the resolver has failed and provides the sensed rotor position and rotor speed signals for controlling the operation of the internal permanent magnet motor when the resolver has not failed and provides the sensorless rotor position and rotor speed signals for controlling the operation of the internal permanent magnet motor when the resolver has failed.

A method is provided for operation of an electric motor system. The method includes determining whether a resolver has failed and operating the electric motor system using resolver signals when the resolver has not failed, while operating the electric motor system using sensorless signals when the resolver has failed.

In addition, an electric motor system is provided. The electric motor system includes an internal permanent magnet motor, an inverter, an inverter controller, a resolver, and a limp home controller. The internal permanent magnet motor includes a plurality of phases and a rotor. The inverter generates a plurality of phase signals in response to modulated control signals and is coupled to the internal permanent magnet motor for providing each of the plurality of phase signals to a corresponding one of the plurality of phases of the permanent magnet motor. The inverter controller generates the modulated control signals in response to a rotor position signal, a rotor speed signal and phase current signals, the phase current signals corresponding to currents of one or more of the plurality of phase signals. The resolver is coupled to the internal permanent magnet motor and senses a position and movement of the rotor, the resolver generating sensed rotor position and rotor speed signals in response to the position and the movement of the rotor. And the limp home controller is coupled to the resolver for determining whether the resolver has failed and is coupled to the inverter controller for providing the sensed rotor position and rotor speed signals to the inverter controller as the rotor position signal and the rotor speed signal when the resolver has not failed while providing sensorless rotor position and rotor speed signals generated by the limp home controller to the inverter controller as the rotor position signal and the rotor speed signal when the resolver has failed.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
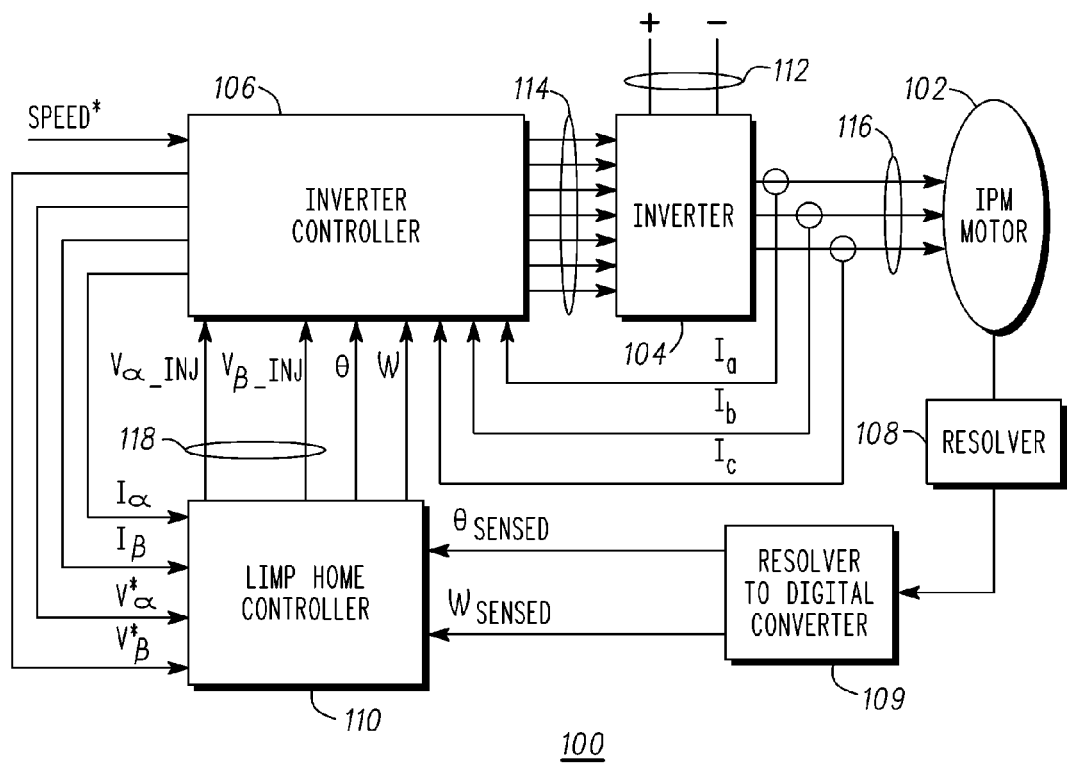
FIG. 1 illustrates a block diagram of an electric motor system in accordance with an embodiment of the present invention.

Referring to FIG. 1, a block diagram of an electric motor system 100 in accordance with an embodiment of the present invention includes a three-phase synchronous permanent magnet motor 102 operating under control of an inverter 104 and an inverter controller 106. A resolver 108 is mechanically coupled to a rotor shaft of the motor 102 and outputs amplitude modulated sine and cosine waveforms sensed from the rotation of the motor 102 to a resolver to digital conversion block 109. The resolver to digital conversion block 109 generates sensed rotor position and rotor speed signals in response to the waveforms from the resolver 108. While the present embodiment includes a three-phase synchronous internal permanent magnet motor 102, the electric motor system 100 may include permanent magnet motors of other designs where the sensed rotor position and rotor speed signals ($\theta_{sensed}$, $\omega_{sensed}$) are generated in response to the position and the movement of the rotor of the motor 102.

The resolver to digital conversion block 109 is coupled to a limp home controller 110 and provides the sensed rotor position and rotor speed signals thereto. In accordance with the present embodiment, the limp home controller 110 generates a rotor position signal, θ, and a rotor speed signal, ω, in response to the sensed rotor position and rotor speed signals.

The inverter 104 is coupled to a direct current (DC) source 112 and generates a plurality of phase signals in response to modulated control signals 114 received from the controller 106 coupled thereto. The number of phase signals corresponds to the number of phases of the motor 102 which, in the present embodiment, includes three phases. The inverter 104 is coupled to the permanent magnet motor 102 and provides the plurality of phase signals on phase wires 116 for controlling the operation of the permanent magnet motor 102.

The inverter controller 106 is coupled to the inverter 104 and generates the modulated control signals 112 in response to the rotor position signal, θ, the rotor speed signal, ω, a speed command signal, Speed*, provided from a higher level controller (not shown), and phase current signals ($I_a$, $I_b$, $I_c$) sensed from the phase wires 116. The inverter controller 106 provides the modulated control signals 114 to the inverter 104 for generation of the plurality of phase signals.

The inverter controller 106 provides two phase stationary frame alpha/beta currents, $I_\alpha$ and $I_\beta$, and two stationary frame voltage commands, $V^*_\alpha$ and $V^*_\beta$, to the limp home controller 110. The limp home controller 110, as described above, generates the rotor position signal, θ, and the rotor speed signal, ω, in response to the sensed rotor position and rotor speed signals ($\theta_{sensed}$, $\omega_{sensed}$) from the resolver 108 and provides the rotor position the rotor speed signals, θ, ω, to the inverter controller 106. The limp home controller 110 also generates two stationary frame injection voltage commands 118, $V^*_{\alpha\_inj}$ and $V^*_{\beta\_inj}$, and provides the injection voltage commands to the inverter controller 106 for operation of the motor 102 at low speeds.

Figure 2:
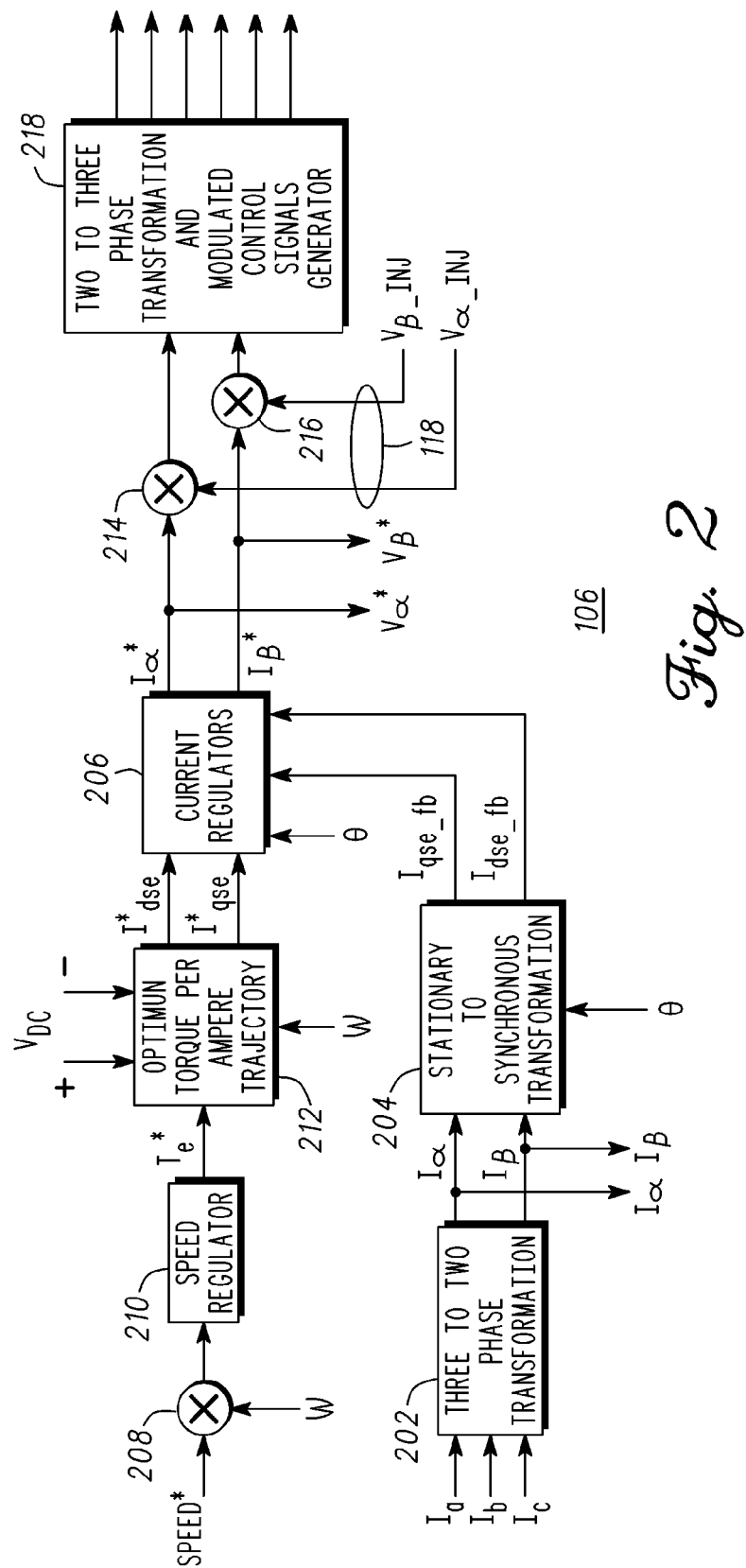
FIG. 2 illustrates a block diagram of an inverter controller of the electric motor system of FIG. 1 in accordance with the embodiment of the present invention.

Referring to FIG. 2, an exemplary block diagram of the inverter controller 106 includes a three to two transformation module 202 which converts the three sensed phase current signals ($I_a$, $I_b$, $I_c$) to equivalent two phase stationary frame alpha/beta currents, $I_\alpha$ and $I_\beta$. The two phase alpha/beta currents, $I_\alpha$ and $I_\beta$, are provided to a stationary to synchronous reference frame transformation module 204 and the limp home controller 110 (FIG. 1). The stationary to synchronous reference frame transformation module 204 transforms the two phase alpha/beta currents $I_\alpha$ and $I_\beta$ to synchronous frame feedback currents, $I_{qse\_fb}$ and $I_{dse\_fb}$, in response to the rotor position signal, θ. The synchronous frame feedback currents, $I_{qse\_fb}$ and $I_{dse\_fb}$, are provided to current regulators 206 for generating stationary frame voltage commands, $V^*_\alpha$ and $V^*_\beta$ in response to the rotor position signal, θ and two current commands in the synchronous reference frame, $I^*_{dse}$ and $I^*_{qse}$.

The speed command signal, Speed*, which, as described above, is provided from a higher level controller, is provided to a summer 208 which subtracts the rotor speed signal, ω, and provides the resultant error signal to a speed regulator module 210 which generates the torque command signal, $T^*_e$. The torque command signal, $T^*_e$, is provided to an optimal torque per ampere trajectory determination block 212 which generates the two current commands in the synchronous reference frame, $I^*_{dse}$ and $I^*_{qse}$, for provision to the current regulators 206 in response to the torque command signal, $T^*_e$, the rotor speed signal, ω, and the DC link voltage, $V_{DC}$.

Thus it can be seen that the stationary frame voltage commands, $V^*_\alpha$ and $V^*_\beta$, are generated by the current regulators 206 by deriving voltage command signals from a combination of the synchronous frame current commands, $I^*_{dse}$ and $I^*_{qse}$, and the synchronous frame feedback currents, $I_{qse\_fb}$ and $I_{dse\_fb}$, and transforming the resultant voltage command signals to the stationary frame voltage commands, $V^*_\alpha$ and $V^*_\beta$, utilizing the rotor position signal, θ. The stationary frame voltage commands, $V^*_\alpha$ and $V^*_\beta$, are combined with injected voltage commands, $V_{\alpha\_inject}$ and $V_{\beta\_inject}$ 118, at signal summers 214, 216 and the resultant signals are provided to a two to three phase transformation and modulated control signal generator 218 which generates the modulated control signals for provision to switching elements of the inverter 104 (FIG. 1).

Figure 3:
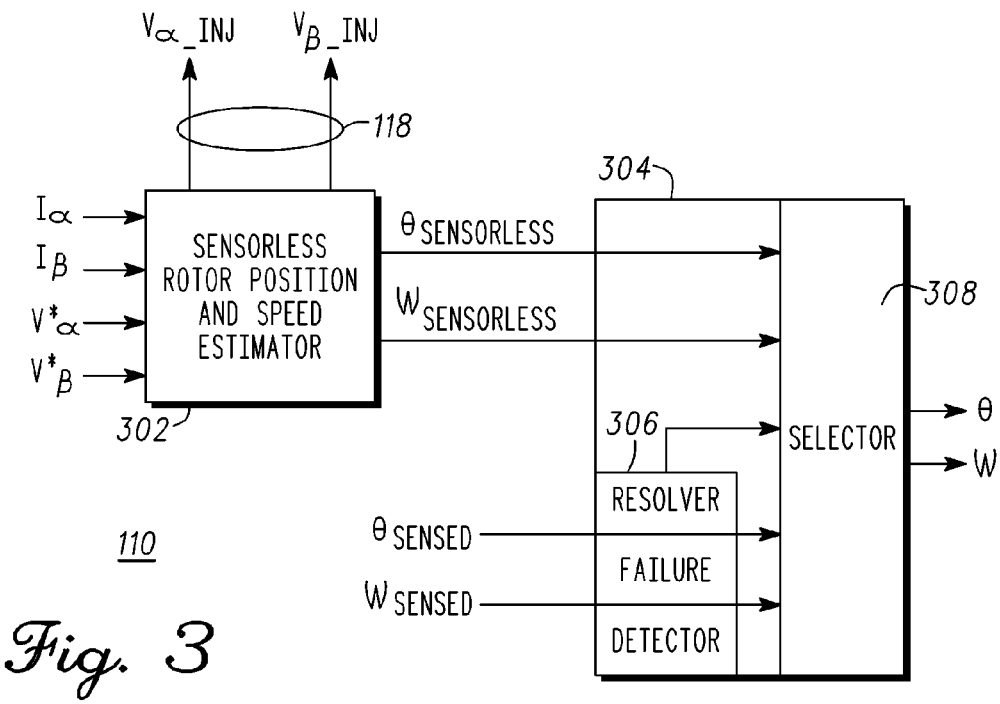
FIG. 3 illustrates a block diagram of a limp home controller of the electric motor system of FIG. 1 in accordance with the embodiment of the present invention.

Referring next to FIG. 3, an exemplary block diagram of the limp home controller 110 in accordance with the present embodiment includes a sensorless rotor and speed estimator 302 and signal selector 304. The sensorless rotor and speed estimator 302 receives two phase stationary frame alpha/beta currents, $I_\alpha$ and $I_\beta$, and stationary frame voltage commands, $V^*_\alpha$ and $V^*_\beta$, and generates sensorless rotor position and rotor speed signals, $\theta_{sensorless}$ and $\omega_{sensorless}$, in response.

The signal selector 304 receives the sensorless rotor position and rotor speed signals, $\theta_{sensorless}$ and $\omega_{sensorless}$, from the sensorless rotor and speed estimator 302 and the sensed rotor position and rotor speed signals, $\theta_{sensed}$, $\omega_{sensed}$, from the resolver 108 (FIG. 1). The sensed rotor position and rotor speed signals, $\theta_{sensed}$, $\omega_{sensed}$, are provided to a resolver failure detect module 306 and a selector 308. The resolver failure detect module 306 determines whether the resolver 108 has failed in response to the sensed rotor position and rotor speed signals, $\theta_{sensed}$, $\omega_{sensed}$. A resolver 108 failure may occur when wires to the resolver fail, for example.

When the resolver failure detect module 306 determines that the resolver has failed, the resolver failure detect module 306 generates a resolver fail signal and provides the resolver fail signal to the selector 308. The selector 308 receives sensorless rotor position and rotor speed signals, $\theta_{sensorless}$ and $\omega_{sensorless}$, from the sensorless rotor and speed estimator 302 as well as the sensed rotor position and rotor speed signals, $\theta_{sensed}$ and $\omega_{sensed}$, from the resolver 108. In the absence of the resolver fail signal (the lack of the resolver fail signal indicating that the resolver 108 has not failed), the selector 308 provides the sensed rotor position and rotor speed signals, $\theta_{sensed}$ and $\omega_{sensed}$, to the inverter controller 106 (FIG. 1) as the rotor position signal, θ, and the rotor speed signal, w. On the other hand, when the selector 308 receives the resolver fail signal indicating that the resolver 108 has failed, the selector 308 provides the sensorless rotor position and rotor speed signals, $\theta_{sensorless}$ and $\omega_{sensorless}$, to the inverter controller 106 (FIG. 1) as the rotor position signal, θ, and the rotor speed signal, ω. In this manner, the limp home controller 106 advantageously provides a limp home operation mode when the resolver 108 fails by generating sensorless rotor position and rotor speed signals, $\theta_{sensorless}$ and $\omega_{sensorless}$, for provision to the inverter controller 106 (FIG. 1) as the rotor position signal, θ, and the rotor speed signal, ω, thereby enabling failsafe operation of the electric motor system 100 to prevent a vehicle stall condition.

Figure 4:
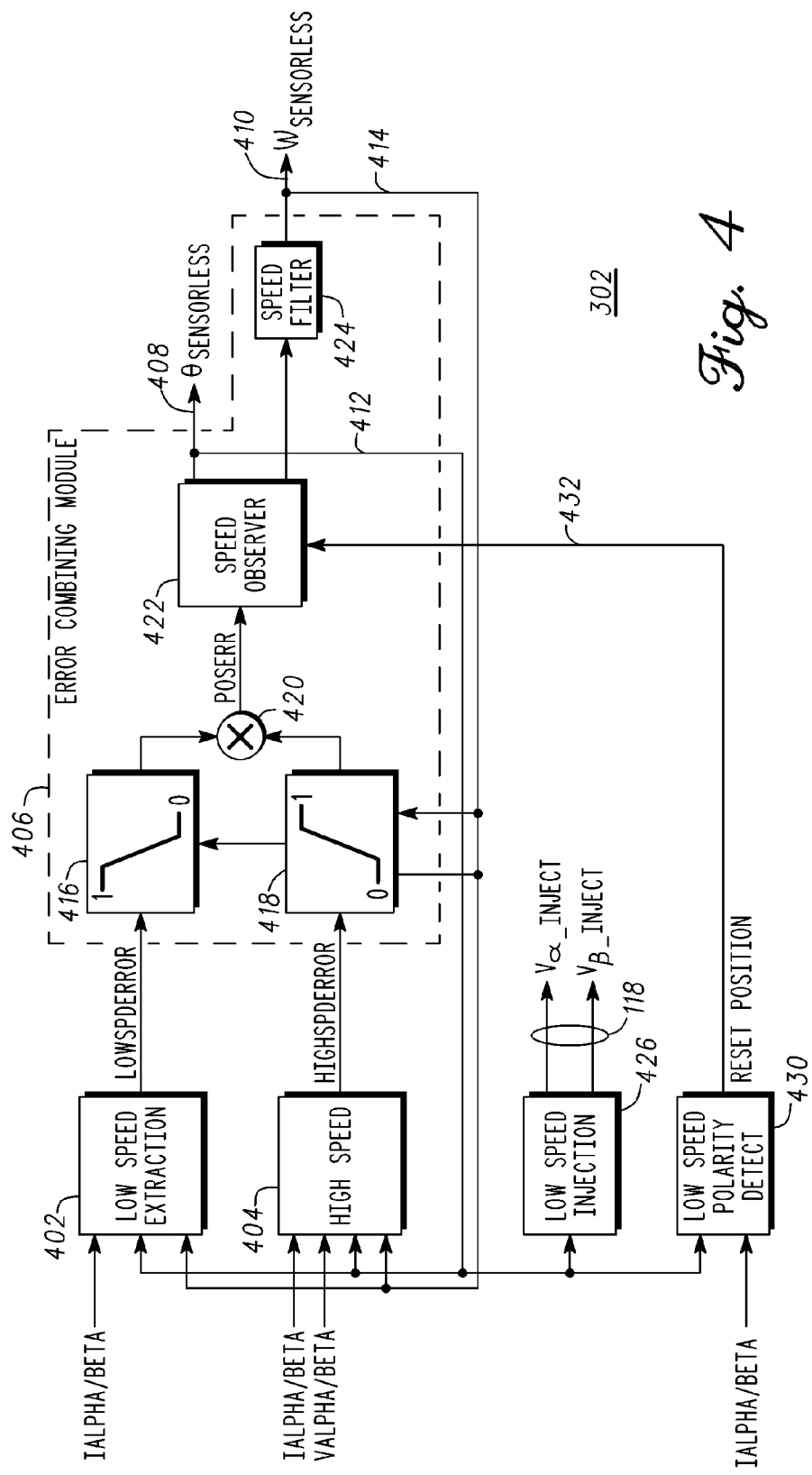
FIG. 4 illustrates a block diagram of a sensorless position and speed estimator of the limp home controller of FIG. 3 in accordance with the embodiment of the present invention.

Referring next to FIG. 4, an exemplary structure of the sensorless position and speed estimator 302 is depicted. A low speed error extraction module 402 and a high speed error module 404 generate a low speed error signal and a high speed error signal, respectively. An error combining module 406 operates as a speed/position generator to generate the sensorless position signal 408 and the sensorless speed signal 410 for providing to the signal selector 304 (FIG. 3) in response to the low speed error signal and the high speed error signal. A sensorless position feedback signal 412 is connected to the sensorless position signal 408, thereby being equivalent thereto. Likewise, a sensorless speed feedback signal 414 is connected to the sensorless speed signal 410.

The low speed error extraction module 402 determines the low speed error signal in response to the sensorless position feedback signal 412, the sensorless speed feedback signal 414 and the two phase currents ($I_{alpha/beta}$). In a similar manner, the high speed error module 404 determines the high speed error signal in response to the sensorless position feedback signal 412, the sensorless speed feedback signal 414, the two phase currents ($I_{alpha/beta}$) and the two stationary frame voltage commands ($V_{alpha/beta}$).

The error combining module 406 includes a low speed error phase out module 416 and a high speed error phase in module 418 for providing a smooth transition from low speed sensorless operation to high speed sensorless operation. The low speed error phase out module 416 receives the low speed error signal and the sensorless speed feedback signal to calculate a low speed error component value by phasing out the low speed error signal as the speed of the motor increases in response to the sensorless speed feedback signal and a predetermined phase-out coefficient. Similarly, the high speed error phase in module 418 receives the high speed error signal and the sensorless speed feedback signal to calculate a high speed error component value by phasing in the high speed error signal as the speed of the motor increases in response to the sensorless speed feedback signal and a predetermined phase-in coefficient. The predetermined phase-out coefficient is selected so that the low speed error component value is equal to the low speed error signal at near zero speeds and smoothly phases out (e.g., straight-line phase out) to where the low speed error component value is zero when the speed reaches a predetermined low-to-high-speed transition speed. In a like manner, the predetermined phase-in signal is selected so that the high speed error component value is equal to zero at near zero speeds and smoothly phases in (e.g., a straight-line phase in) to where the high speed error component value is equal to the high speed error signal when the speed reaches or exceeds the predetermined low-to-high-speed transition speed. An error signal summer 420 combines the low speed error component value and the high speed error component value to generate a rotor error position signal. A speed observer module 422 receives the rotor position error signal and, in response thereto, calculates the sensorless position signal 408 and an observed speed signal, the observed speed signal being filtered by a speed filter 424 to generate the sensorless speed signal 410.

A low speed injection module 426 generates the injected voltage commands, $V_{\alpha\_inject}$ and $V_{\beta\_inject}$, as low speed injection signals 118 for providing to the summers 214, 216 (FIG. 2) at startup of the electric motor system 100 and at near zero low speeds to inject a high frequency signal into the flux axis of the permanent magnet motor 102 for operation of the low speed extraction module 402. The injected voltage commands, $V_{\alpha\_inject}$ and $V_{\beta\_inject}$, are generated in response to an injected voltage, $V_{inj}$, which is calculated in accordance with Equation (1).

$$V_{inj} \equiv V_0 - V^*_{inj\_slope}(abs(\omega_r - \omega_{LH})) \quad (1)$$

wherein $V_0$ is the injected voltage at startup, $V^*_{inj\_slope}$ is the slope at which the voltage is decremented or incremented as a function of motor speed, and the difference ($\omega_r - \omega_{LH}$) is the difference between the rotor speed, $\omega_r$, and low to high speed threshold, $\omega_{LH}$. When the sensorless position feedback signal 210 has a near-zero value, the low speed injection module 226 generates a predetermined low speed injection signal ($V_{alpha/beta\_inj}$) for injecting a high frequency signal into a flux axis of the motor 102 at low speeds and provides the predetermined low speed injection signal as voltage signals 118 to the signal summers 214, 216 (FIG. 2) for combining with the synchronous frame voltage command signals, $V^*_\alpha$ and $V^*_\beta$. The high frequency signal is injected into the flux axis of the motor 102 at low speeds to generate the sensorless speed feedback signal 414 and the sensorless position feedback signal 412 at the low speeds.

A low speed polarity detector 430 compares the low speed error determined in response to the sensorless position feedback signal 412 to the two phase currents ($I_{alpha/beta}$). When the initial rotor position information is determined by the sensorless rotor position and speed estimator 302, it is imperative to differentiate between the positive and negative D axis (i.e., the rotor magnet north and south poles). The low speed polarity detector 430 determines from the low speed error and the two phase currents ($I_{alpha/beta}$) whether the sensorless rotor position signal is properly aligned with the rotor north pole. If the sensorless rotor position signal is not properly aligned with the rotor north pole, a reset position signal 432 is provided to the speed observer module 422. In response to the reset position signal 432, the speed observer module 422 switches the polarity of the sensorless rotor position signal so that the position signal 408 is correctly aligned with the rotor position.

Figure 5:
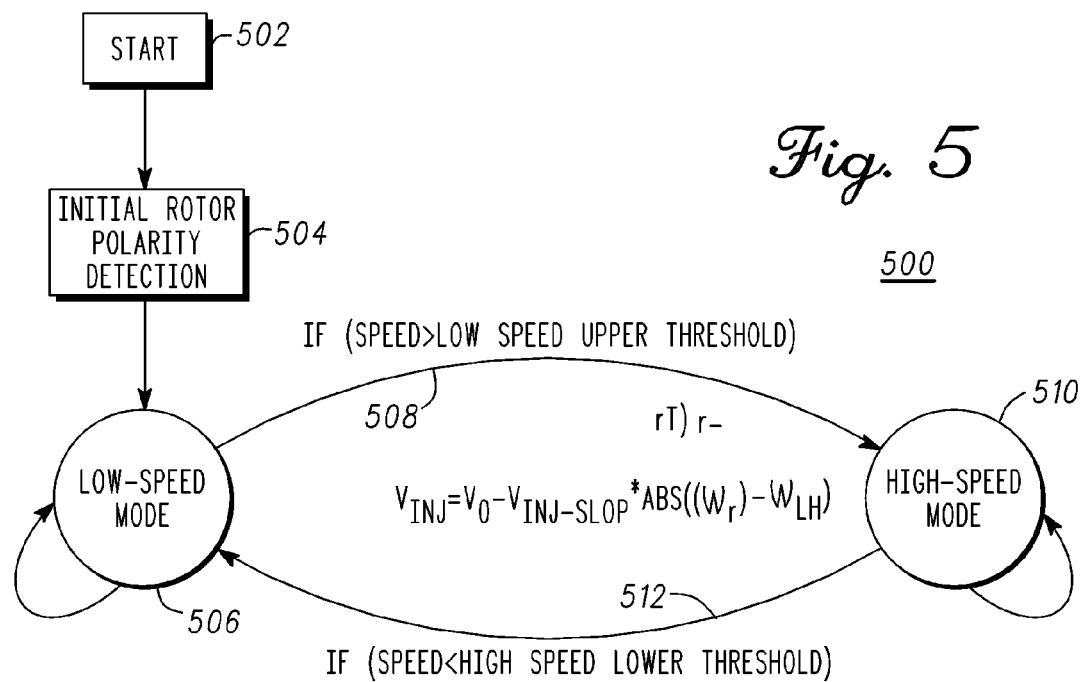
FIG. 5 illustrates modal operation of the sensorless position and speed estimator of FIG. 4 in accordance with the embodiment of the present invention.

In this manner, the sensorless position and speed estimator 302 provides the sensorless position signal 408, θ, and the sensorless speed signal 410, ω, as feedback signals at both low and high speeds. Particularly, the error combining module 406, including the low speed error phase out module 416 and the high speed error phase in module 418, provides a smooth transition from low speed sensorless operation to high speed sensorless operation. Referring to FIG. 5, a modal operation diagram 500 depicts operation of the sensorless position and speed estimator 302. At startup 502, as described above, the low speed injection module 426 initiates the calculation of the sensorless position signal 408 and the sensorless speed signal 410. Next, the low speed polarity detect module 430 performs the initial polarity detection 504 and corrects the polarity of the sensorless position signal 408, if necessary. Operation of the sensorless position and speed estimator 302 then proceeds in accordance with a low speed mode 506 as determined by the low speed extraction module 402. As described above, operation in accordance with the low speed mode provides an injection Voltage, $V_{inj}$, in accordance with Equation (1).

Operation in accordance with the low speed mode 506 continues until the speed exceeds a predetermined low speed upper threshold. When the speed exceeds the predetermined low speed upper threshold, operation of the sensorless position and speed estimator 302 operates in a transition mode 508, transitioning from the low speed mode 506 to a high speed mode 510. Operation in accordance with the high speed mode 510 continues until the speed falls below a predetermined high speed lower threshold, at which point the operation of the sensorless position and speed estimator 302 operates in a transition mode 512, transitioning from the high speed mode 510 to the low speed mode 506. Such predetermined high speed lower threshold could be set at approximately five hundred revolutions per minute of the motor 102 and such predetermined low speed upper threshold could be set at approximately eight hundred revolutions per minute of the motor 102.

Thus it can be seen that the error combining module 406 provides low speed sensorless rotor position and rotor speed signals when operating in the low speed mode 506 when the speed is below the predetermined high speed lower threshold and provides high speed sensorless rotor position and rotor speed signals when operating in the high speed mode 510 when the speed is above the predetermined low speed upper threshold. When the speed is less than the predetermined low speed upper threshold and more than the predetermined high speed lower threshold, the error combining module 406 provides transition signals for the sensorless rotor position and rotor speed signals, the transition signals generated in accordance with the low speed error phase out module 416 and the high speed error phase in module 418 to provide a smooth transition 508 from the low speed mode 506 to the high speed mode 510 and, likewise, to provide a smooth transition 512 from the high speed mode 510 to the low speed mode 506.

Figure 6:
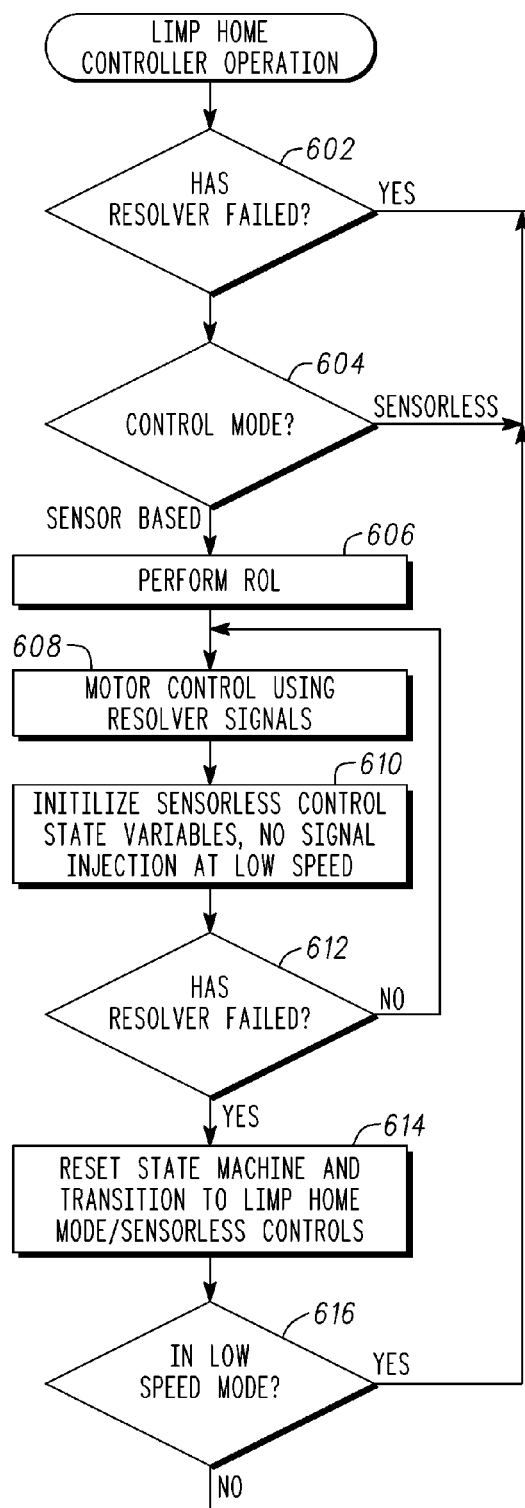
FIG. 6 illustrates a flow chart of the operation of a limp home controller of the electric motor system of FIG. 1 in accordance with the embodiment of the present invention.
Figure 6:
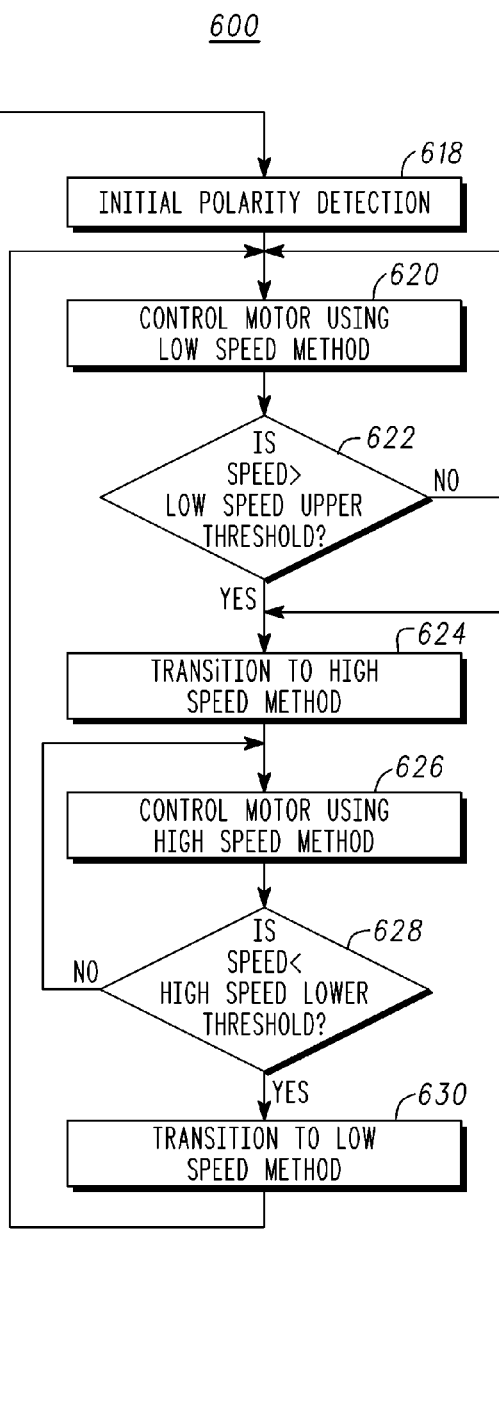

While an exemplary construction of the limp home controller 110 has been depicted in FIGS. 3 and 4, those skilled in the art will realize that a limp home controller 110 which provides rotor position and rotor speed signals, θ and ω, when a resolver is operating correctly and when a resolver fails can be constructed in any one of a number of different configurations. For example, the limp home controller 106, including the generation of the sensorless position signal and the sensorless speed signal can be enabled in software. Accordingly, FIG. 6 depicts a flowchart 600 of the operation of the limp home controller 110 in accordance with the present embodiment.

Initially, the limp home controller 110 determines 602 whether the resolver 108 has failed. If the resolver 108 has not failed, the limp home controller 110 determines 604 whether the control mode at startup is a sensorless control mode or a sensor (i.e., resolver 108) based control mode as selected by a signal from a higher level controller which can make such selection in accordance with predefined parameters.

For sensor based operation, processing first performs 606 Resolver Offset Learning (ROL). ROL involves injecting a high frequency signal into the motor 102 and defining, in response to the change in the resolver signals, a resolver offset value (e.g., a number of degrees different between the resolver 108 sensed position signal and the angle of the rotor flux in the motor 102). After performing ROL 606, the operation of the motor 102 is controlled 608 using the sensed rotor position and rotor speed signals from the resolver 108. During sensor based operation, sensorless control state variables are initialized and no high frequency signal is injected at low speeds (step 610). Processing then continues to perform steps 608 and 610 in sensed based operation until detection 612 of resolver failure.

When resolver failure is detected 612, operation transitions to sensorless control mode and the state machine is reset with the sensorless control state variables (step 614) so that sensorless control mode can continue operation from the operational state when the resolver 108 failed. Next, processing determines 616 whether the current operational state is low speed mode 506 or high speed mode 510 (FIG. 5).

If operation is in the low speed mode 616, processing performs an initial polarity detect 618 to determine if the low speed sensorless rotor position signal has the correct polarity. After correcting the polarity of the low speed sensorless rotor position signal if necessary 618, operation continues 620 in accordance with the low speed sensorless mode 506 until the speed of the motor 102 becomes 622 greater than a predetermined low speed upper threshold.

When the speed of the motor 102 becomes 622 greater than the predetermined low speed upper threshold 622, operation transitions 624 to the high speed sensorless mode 510. Operation then continues 626 in accordance with the high speed sensorless mode 510 until the speed of the motor 102 becomes 628 less than a predetermined high speed lower threshold. When the speed of the motor 102 becomes 628 less than the predetermined high speed lower threshold 628, operation returns to step 620 for controlling the motor 102 in accordance with the low speed sensorless mode 506.

If at step 616 it is determined that operation of the motor 102 when failure of the resolver 108 was detected 612 was in the high speed mode, processing jumps to step 624 to transition into high speed sensorless mode 510. Further, if at startup the sensorless control mode is selected 604, operation starts in the low speed sensorless operation mode by performing 618 initial polarity detect.

Thus it can be seen that the present method and apparatus for limp home operational mode of the electric motor system 100 when the resolver 108 fails utilizes position sensorless algorithms to provide a backup for motor controls, thereby providing a limp home operational mode which allows the driver to safely drive a vehicle with a failed resolver to a service station. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operation of an electric motor system comprising:
    determining whether a resolver has failed;
    operating the electric motor system using resolver signals when the resolver has not failed; and
    determining sensorless signals based on a low speed mode, a high speed mode and a transition mode; and
    operating the electric motor system using the sensorless signals when the resolver has failed.

2. The method in accordance with claim 1 wherein the resolver signals comprise signals generated in response to a rotor position and a rotor speed of a rotor of an internal permanent magnet motor of the electric motor system.

3. The method in accordance with claim 1 wherein the sensorless signals comprise signals corresponding to a rotor position and a rotor speed of a rotor of an internal permanent magnet motor of the electric motor system.

4. The method in accordance with claim 3 wherein the sensorless signals comprise a high speed sensorless rotor position signal and a high speed sensorless rotor speed signal.

5. The method in accordance with claim 3 wherein the sensorless signals comprise a low speed sensorless rotor position signal and a low speed sensorless rotor speed signal.

6. The method in accordance with claim 5 wherein the sensorless signals further comprise low speed injection signals.

7. The method in accordance with claim 4 wherein the sensorless signals further comprise low speed sensorless rotor position and rotor speed signals, and wherein rotor position and rotor speed signals transition from the high speed sensorless rotor position and rotor speed signals to the low speed sensorless rotor position and rotor speed signals in response to a speed of the internal permanent magnet motor becoming less than a predetermined high speed lower threshold value.

8. The method in accordance with claim 7 and wherein the rotor position and rotor speed signals further transition from the low speed sensorless rotor position and rotor speed signals to the high speed sensorless rotor position and rotor speed signals in response to the speed of the internal permanent magnet motor becoming more than a predetermined low speed upper threshold value.

9. A limp home controller for controlling operation of an internal permanent magnet motor, the limp home controller comprising:
   a sensorless speed and position estimator for generating sensorless rotor position and rotor speed signals based on a low speed mode, a high speed mode and a transition mode; and
   a signal selector coupled to a resolver for receiving sensed rotor position and rotor speed signals therefrom and coupled to the sensorless speed and position estimator for receiving the sensorless rotor position and rotor speed signals therefrom, the signal selector determining whether the resolver has failed and providing the sensed rotor position and rotor speed signals for controlling the operation of the internal permanent magnet motor when the resolver has not failed and providing the sensorless rotor position and rotor speed signals for controlling the operation of the internal permanent magnet motor when the resolver has failed.

10. The limp home controller in accordance with claim 9 wherein the signal selector includes a resolver failure detector coupled to the resolver for receiving the sensed rotor position and rotor speed signals therefrom and determining in response to the sensed rotor position and rotor speed signals whether the resolver has failed.

11. The limp home controller in accordance with claim 9 wherein the sensorless speed and position estimator generates high speed sensorless rotor position and rotor speed signals in response to a speed of the internal permanent magnet motor being greater than a first predetermined speed.

12. The limp home operation controller in accordance with claim 11 wherein the sensorless speed and position estimator also generates low speed sensorless rotor position and rotor speed signals in response to the speed of the internal permanent magnet motor being less than a second predetermined speed.

13. The limp home operation controller in accordance with claim 12 wherein the sensorless speed and position estimator further generates low speed injection signals for control of the operation of the internal permanent magnet motor in response to the speed of the internal permanent magnet motor being less than the second predetermined speed.

14. The limp home operation controller in accordance with claim 12 wherein the sensorless speed and position estimator generates transition signals in response to the speed of the internal permanent magnet motor being less than the first predetermined speed and more than the second predetermined speed.

15. An electric motor system comprising:
   an internal permanent magnet motor comprising a plurality of phases and including a rotor;
   an inverter for generating a plurality of phase signals in response to modulated control signals and coupled to the internal permanent magnet motor for providing each of the plurality of phase signals to a corresponding one of the plurality of phases of the permanent magnet motor;
   an inverter controller for generating the modulated control signals in response to a rotor position signal, a rotor speed signal and phase current signals, the phase current signals corresponding to currents of one or more of the plurality of phase signals;
   a resolver coupled to the internal permanent magnet motor for sensing a position and movement of the rotor, the resolver generating sensed rotor position and rotor speed signals in response to the position and the movement of the rotor; and
   a limp home controller coupled to the resolver and the inverter controller that determines whether the resolver has failed and, when the resolver has not failed, provides the sensed rotor position and rotor speed signals to the inverter controller as the rotor position signal and the rotor speed signal, and when the resolver has failed, determines sensorless rotor position and rotor speed signals based on a low speed mode, a high speed mode and a transition mode and provides the sensorless rotor position and rotor speed signals generated by the limp home controller to the inverter controller as the rotor position signal and the rotor speed signal.

16. The electric motor system in accordance with claim 15 wherein the limp home controller comprises:
   a sensorless speed and position estimator for generating the sensorless rotor position and rotor speed signals; and
   a signal selector coupled to the resolver for receiving the sensed rotor position and rotor speed signals therefrom and coupled to the sensorless speed and position estimator for receiving the sensorless rotor position and rotor speed signals therefrom, the signal selector determining whether the resolver has failed and providing the sensed rotor position and rotor speed signals to the inverter controller as the rotor position signal and the rotor speed signal when the resolver has not failed and providing the sensorless rotor position and rotor speed signals to the inverter controller as the rotor position signal and the rotor speed signal when the resolver has failed.

17. The electric motor system in accordance with claim 16 wherein the signal selector includes a resolver failure detector coupled to the resolver for receiving the sensed rotor position and rotor speed signals therefrom and determining in response to the sensed rotor position and rotor speed signals whether the resolver has failed.

18. The electric motor system in accordance with claim 16 wherein the sensorless speed and position estimator comprises a high speed error calculator for determining a high speed error signal in response to the plurality of phase signals, a sensorless position feedback signal, and a sensorless speed feedback signal.

19. The electric motor system in accordance with claim 18 wherein the sensorless speed and position estimator further comprises a low speed error calculator for determining a low speed error signal in response to the plurality of phase signals, the sensorless position feedback signal, and the sensorless speed feedback signal.

20. The electric motor system in accordance with claim 19 wherein the sensorless speed and position estimator further comprising an error combiner coupled to the high speed error calculator and the low speed calculator for determining the sensorless position signal and the sensorless speed signal in response to the high speed error signal and the low speed error signal, wherein the sensorless position feedback signal is equivalent to the sensorless position signal and the sensorless speed feedback signal is equivalent to the sensorless speed signal.

* * * * *